Dec. 23, 1969   F. H. BENTHAM   3,484,918
TIRE RASPS
Filed Jan. 12, 1967
2 Sheets-Sheet 1
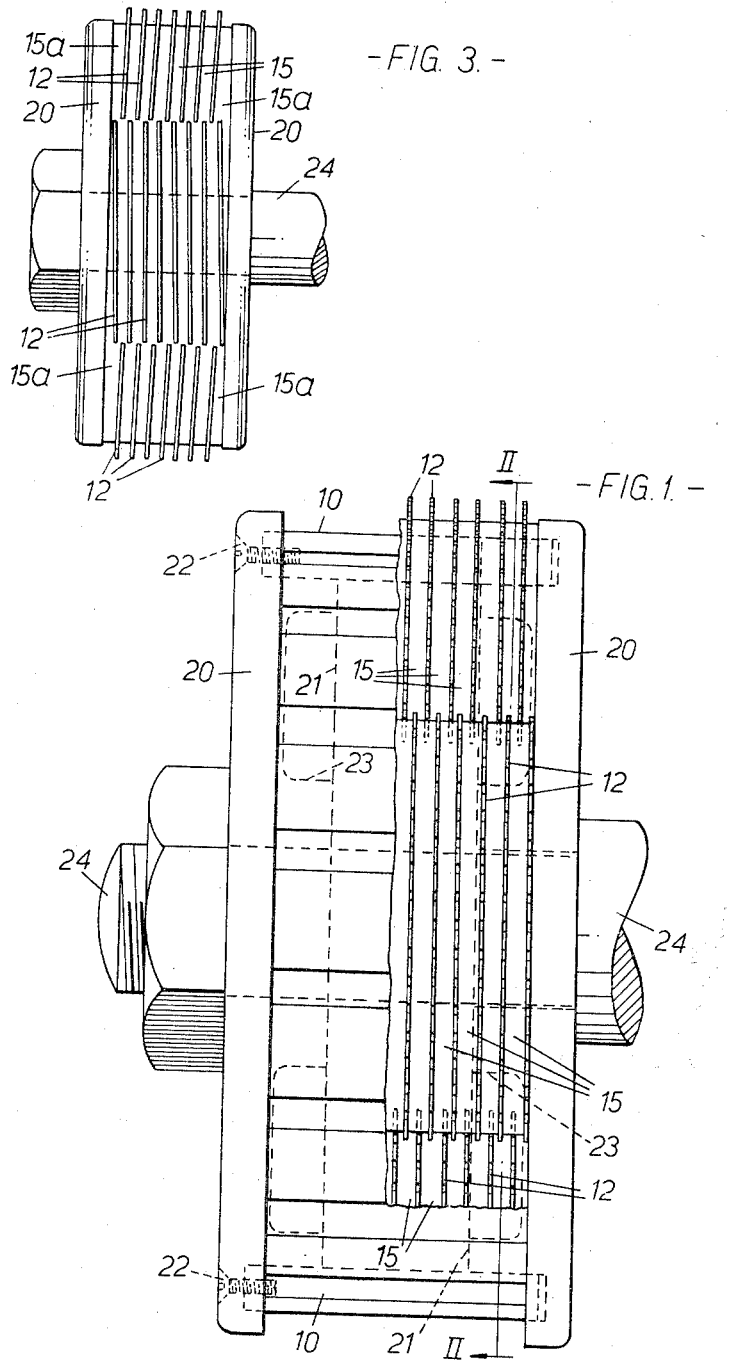
INVENTOR:
FRANK HOLDSWORTH BENTHAM
BY
Linton and Linton
ATTORNEYS Dec. 23, 1969   F. H. BENTHAM   3,484,918
TIRE RASPS
Filed Jan. 12, 1967   2 Sheets-Sheet 2
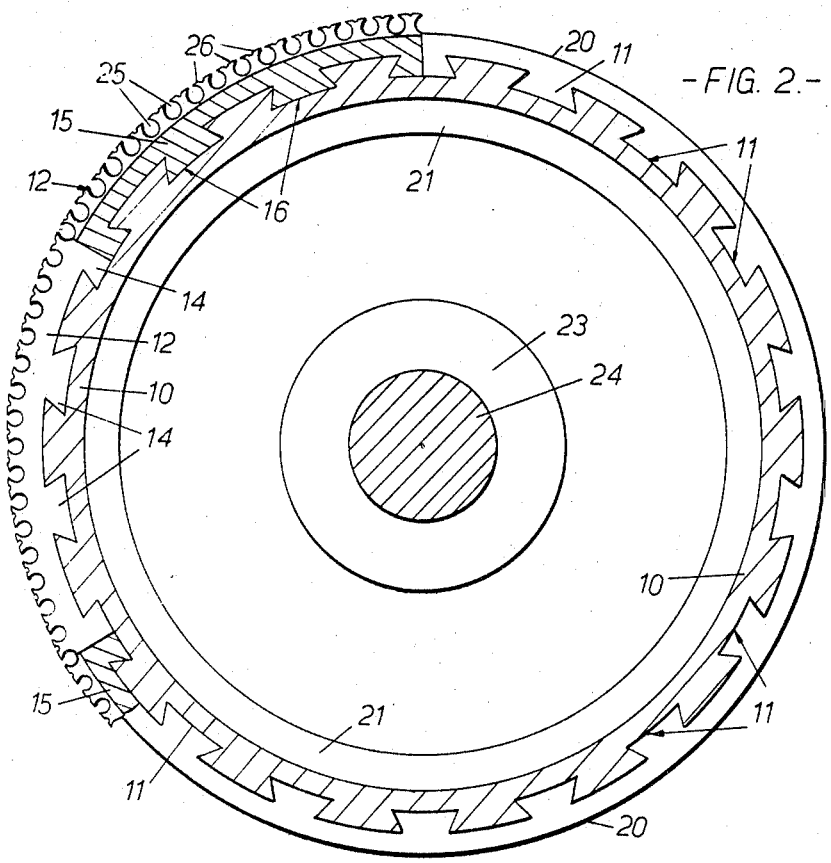
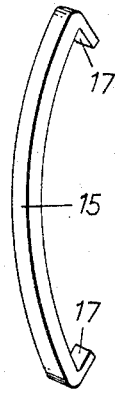
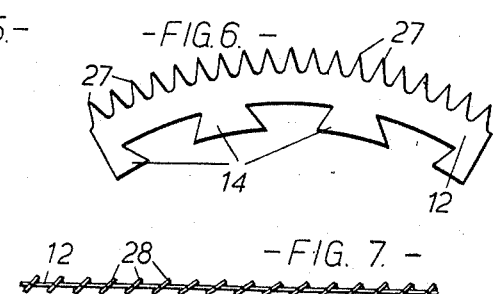
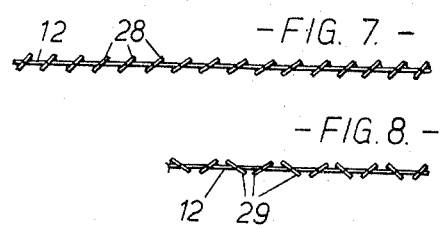
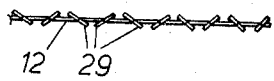
INVENTOR:
FRANK HOLDSWORTH BENTHAM
BY
*Linton and Linton*
ATTORNEYS

United States Patent Office 3,484,918
Patented Dec. 23, 1969

3,484,918
TIRE RASPS
Frank Holdsworth Bentham, Milholm, Santon,
Isle of Man, England
Filed Jan. 12, 1967, Ser. No. 608,776
Claims priority, application Great Britain, Jan. 14, 1966,
1,767/66
Int. Cl. B23d 17/00
U.S. Cl. 29—79                              3 Claims

ABSTRACT OF THE DISCLOSURE

The present tire rasp is for abrading or buffing rubber tires and has a tubular body with keyways in which extend key projections on toothed arcuate blade components and spacers and which blade components are rotated against the tires for buffing or abrading the same.

---

This invention relates to devices or appliances of the kind employed to abrade or buff vehicular rubber tires in preparing same for vulcanising, remoulding or retreading, well know procedures in the tire industry and carried out so as to extend the useful life of a tire.

Devices or appliances of the kind referred to are commonly referred to as tire rasps, and conventionally each rasp comprises a plurality of circularly arranged, relatively short, arcuate sheet metal members or blades the outer working edges whereof are formed with teeth, e.g. by providing a plurality of cut-outs which define teeth of generally dovetail configuration, and which teeth may be disposed at various angles or dispositions relative to the general plane of the blade. Such arcuate blade components each are provided with through apertures spaced from their toothed working edges whereby they may be mounted spacedly on support pins of a rotary rasp structure with the teeth thereof presented edgewise to an outwardly of the rasp's periphery.

Such rasp arrangements have a disadvantage, inter alia, in that the assembly of the blade components on the supporting structure is a relatively lengthy and time wasting procedure. Further, the method of securing the blade components by pins inserted through the provided apertures is unsatisfactory due to the high speeds at which the rasps are required to be rotated and which at times may cause distortion of the pins and even fracture of same. Such distortion and fracture of the pins can cause a rasp's structures to disintegrate in use with a danger of injury to the operators and damage to expensive machinery. Even minor distortions of the blade holding pin causes a variation in finish of the rubber being processed which is detrimental.

The present invention has for its object an improved form of rasp structure and toothed blades therefor adapted to obviate the above, and other, disadvantages. To this end, and in one mode of embodiment, a rasp structure comprises a tubular body said body being formed with a series of circumferentially spaced keyways (or key projections); a plurality of toothed arcuate blade components the inner edges whereof are formed with one of more key projections (or keyways) adapted for engagement with keyways (or key projections) of the body; and means for locating the blade members against axial displacement.

The cooperating keyways and key projections may be of any suitable cross-sectional shape adapted to hold the blade components securely against centrifugal force. For example, said keyways and projections may be generally of dovetail cross-section, or alternatively may be of inverted T cross-sectional shape. The means for locating said blades laterally may consist of side or end plates of the assembly secured to the body as by bolting or screwing and said plates may be apertured so as to permit of the assembly being fitted to a driving shaft or spindle. Preferably, said end plates are formed with a circular flange adapted to fit snugly within the end of the tubular body.

The arcuate components may be disposed helically around the body by the interposition at each end of the body of wedged or tapered spacer members.

In an alternative mode of embodiment adjacent blade component may be disposed at reversed angles, and this can be simply achieved by interposing between said blade components reversely located tapered spacer members. Such a blade disposition will be useful when exceptionally fine finishes are desired on rubber being treated.

The invention is further described with the aid of the accompanying drawings which illustrate examples of same.

In said drawings,

FIG. 1 is an elevation of a tire rasp structure with parts removed to illustrate its construction.

FIG. 2 is a section taken as on line II—II of FIG. 1.

FIG. 3 is a view similar to that of FIG. 1 but illustrating, more or less schematically, an alternative blade disposition.

FIGS. 4 and 5 are perspective views illustrating two types of spacers.

FIG. 6 is a side elevation of one form of blade component, and

FIGS. 7 and 8 are plan views of blade components illustrating two methods of setting the teeth.

Referring now to said drawings, and first more particularly to FIGS. 1 and 2, the numeral 10 denotes a cylindrical metal body which is formed so as to provide a series of circumferentially spaced keyways 11, in this instance of dovetail cross-section, and which extend for the full length of said body. The numeral 12 generally denotes arcuate relatively short blade components which are secured around the body 12 by means of key projections 14 formed on their inner edges, corresponding in shape to the cross-sectional shape of the keyways 11 of the body, and which may be slidably engaged within said keyways 11 from either end thereof.

Said blade components 12 are spaced from each other laterally by spacer members, generally denoted by the numeral 15, and which are shaped so as to also be locatable in the keyways 11 of the body 10. In FIG. 4 there is illustrated a spacer member 15 per se which is formed with a series of key projections 16 adapted to engage in the keyways 11. In FIG. 5 an alternative form of spacer is shown provided with convergent end pieces 17 adapted to fit over the oppositely inclined wall portions of two circumferentially spaced keyways 11.

The blade components 12 and spacers 15 are clamped against axial displacement between two end plates 20, 20 each of which is provided with a circular flange 21 adapted to fit snugly within the bore of the body 10 and one of said end plates being secured to said body as by screws 22.

The end plates 20 also are provided with apertured bosses 23 whereby the assembly may be mounted and locked upon a driving shaft or spindle 24.

The blade components 12 may be arranged in staggered disposition as shown in FIG. 1, or in a generally helical disposition by the provision at each end of the body of appropriately tapered spacer members 15. Again, circumferentially adjacent series of blades 12 may be disposed at reverse angles, see FIG. 3, and this may be achieved by interposing between the blade components 12 reversely situated or tapered spacer members 15a.

In FIG. 2 the tooth shapes of the blade members 12 are defined by a series of circular cut-outs 25 which break out of the working edge thereby to provide cutting teeth. Alternatively, said cut-outs may be square in shape and be disposed with one diagonal radially directed relative to the arc of the blade whereby the corners thereof break out of the working edge to provide cutting teeth having positive cutting angles. If desired, the metal between the so formed teeth may be removed, for example as at 26, to reduce friction.

Said blade components 12 may be of any desired length commensurate with ease of manufacture and assembly.

FIG. 6 illustrates a blade component 12 having teeth 27 of plain, more or less saw-tooth, type. FIG. 7 illustrates a blade component 12 the teeth 28 whereof are all set at the same inclination to the general plane of the blade, and FIG. 8 shows a blade fragment 12 having teeth 29 which are set alternately at opposite angles of inclination.

Tire rasps according to the invention obviate the disadvantages associated with conventional rasps in that they are simple to assemble and may be operated efficiently for long periods of time without danger of distortion or breakage occurring.

What I claim as my invention and desire to secure by Letters Patent is:

1. A tire rasp structure comprising a unitary tubular body, a series of circumferentially spaced, axially extending, keyways in said body extending the full length thereof, a plurality of toothed arcuate blade components, the axially inner edges whereof are formed with key projections adapted for engagement with said keyways of said body, spacer members disposed between said blade components and having parts also locatable in the keyways of said body, and end plates provided one at each end of said body with at least one of said end plates being removable and secured to said body by screw means whereby said blade components and intervening spacer members are clamped immovably in operative position.

2. A tire rasp structure, as claimed in claim 1, wherein said end plates are apertured so as to permit of the assembly being mounted on a driving shaft or spindle.

3. A tire rasp structure, as claimed in claim 2, wherein said cylindrical body is tubular and the end plates each are formed with a circular flange adapted to fit within the bore of said body.

References Cited

UNITED STATES PATENTS

| 2,703,446 | 3/1955 | Jensen | 29—79 |
| 2,842,833 | 7/1958 | Glodde | 29—79 |
| 2,896,309 | 7/1959 | Jensen | 29—79 |
| 2,930,110 | 3/1960 | Glodde | 29—78 |
| 3,082,506 | 3/1963 | Jensen | 29—79 |

FOREIGN PATENTS 985,524   3/1951   France.

HARRISON L. HINSON, Primary Examiner